(12) United States Patent
Kizilgul et al.

(10) Patent No.: US 12,322,182 B1
(45) Date of Patent: Jun. 3, 2025

(54) VISUAL WAKE CONTENT FOR IMAGE PROCESSING

(71) Applicant: Amazon Technologies, Inc., Seattle, WA (US)

(72) Inventors: Serdar Kizilgul, Fremont, CA (US); Steven L. Teig, Menlo Park, CA (US); Murali Dharan, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 513 days.

(21) Appl. No.: 17/532,903

(22) Filed: Nov. 22, 2021

Related U.S. Application Data (60) Provisional application No. 63/117,375, filed on Nov. 23, 2020.

(51) Int. Cl.
| | |
|---|---|
| *G06V 20/52* | (2022.01) |
| *G06N 3/04* | (2023.01) |
| *G06V 10/82* | (2022.01) |
| *G06V 20/64* | (2022.01) |

(52) U.S. Cl.
CPC ............... *G06V 20/52* (2022.01); *G06N 3/04* (2013.01); *G06V 10/82* (2022.01); *G06V 20/64* (2022.01)

(58) Field of Classification Search
None
See application file for complete search history.

(56) References Cited

U.S. PATENT DOCUMENTS

| | | | | |
|---|---|---|---|---|
| 5,164,992 | A * | 11/1992 | Turk | H04N 19/94 725/12 |
| 5,321,795 | A * | 6/1994 | Alvarez de Toledo | G05B 21/02 706/14 |
| 9,432,421 | B1 * | 8/2016 | Mott | G06T 19/006 |
| 9,697,828 | B1 | 7/2017 | Prasad et al. | |

(Continued)

OTHER PUBLICATIONS

Gu T, Liu K, Dolan-Gavitt B, Garg S. Badnets: Evaluating backdooring attacks on deep neural networks. IEEE Access. Apr. 11, 2019;7:47230-44. (Year: 2019).*

(Continued)

*Primary Examiner* — Michelle M Entezari Hausmann
(74) *Attorney, Agent, or Firm* — K&L Gates LLP (57) ABSTRACT that is captured by one or more images (e.g., by a video or several pictures of the scene). The method analyzes a captured image to identify a unique predefined displayed content (e.g., a first pattern or a sub-pattern of the first pattern) in a first region of the image. When the predefined displayed content is identified in the captured image, the method analyzes a second region of the image that is associated with the first region, in order to determine whether a set of one or more objects is within the second region. The second region is the same as the first region in some embodiments, while in other embodiments it is a bounding region (e.g., bounding shape) that encompasses the first region and a third region around the first region. In yet other embodiments, the second region has another association with the first region. When the method determines that an object is within the second region, the method generates and sends a notification (e.g., an email, a text message, an in-app message, etc.) regarding the detection of the object in the image.

20 Claims, 9 Drawing Sheets

(56) References Cited

U.S. PATENT DOCUMENTS

| | | | |
|---|---|---|---|
| 10,217,346 B1 | 2/2019 | Zhang et al. | |
| 10,628,790 B1* | 4/2020 | Aggarwal | G05D 1/0212 |
| 10,847,137 B1 | 11/2020 | Mandal et al. | |
| 11,003,874 B1* | 5/2021 | Astvatsaturov | G06K 7/1443 |
| 11,861,546 B1* | 1/2024 | Wang | G06Q 10/0833 |
| 11,900,686 B1* | 2/2024 | Wang | G06V 20/56 |
| 2014/0253743 A1* | 9/2014 | Loxam | H04N 5/272 |
| | | | 348/207.1 |
| 2015/0340032 A1 | 11/2015 | Gruenstein | |
| 2016/0071399 A1 | 3/2016 | Altman et al. | |
| 2016/0240193 A1 | 8/2016 | Gulati et al. | |
| 2016/0293168 A1 | 10/2016 | Chen | |
| 2017/0017240 A1* | 1/2017 | Sharma | B64C 39/024 |
| 2017/0061625 A1 | 3/2017 | Estrada et al. | |
| 2017/0154425 A1 | 6/2017 | Pierce et al. | |
| 2018/0061408 A1 | 3/2018 | Andreas et al. | |
| 2019/0147904 A1 | 5/2019 | Tao et al. | |
| 2019/0155566 A1 | 5/2019 | Dory et al. | |
| 2020/0051550 A1 | 2/2020 | Baker | |
| 2020/0234121 A1* | 7/2020 | Stapleton | G06N 3/02 |
| 2020/0273201 A1* | 8/2020 | Mittal | G06V 10/454 |
| 2021/0082022 A1* | 3/2021 | Whitman | G06Q 10/06395 |
| 2021/0103820 A1* | 4/2021 | Ghosh | G06N 3/084 |
| 2021/0374970 A1* | 12/2021 | He | G06T 7/11 |
| 2021/0409645 A1* | 12/2021 | Xu | G06V 10/454 |

OTHER PUBLICATIONS

Marcheret, Etienne, et al., "Detecting Audio-Visual Synchrony Using Deep Neural Networks," INTERSPEECH 2015, Sep. 6-10, 2015, 5 pages, ISCA, Dresden, Germany.

* cited by examiner

VISUAL WAKE CONTENT FOR IMAGE PROCESSING

BACKGROUND

In recent years, there has been a dramatic increase in the use of machine learning applications. In large part, this increase has been fueled by increases in the computational resources of computers and the plethora of available compute power that is provided relatively cheaply in many private and public datacenters. Because of the availability of this compute power, many machine-learning applications are deep learning applications that utilize many layers of processing nodes. Such deep learning processes require lots of computational resources, which are available in datacenters, but are often lacking in the outside world where devices have more limited computational resources. On the other hand, machine learning applications executed by IoT (Internet of Things) Devices in the field are quite lacking in speed, accuracy, and power consumption efficiency.

SUMMARY that is captured by one or more images (e.g., by a video or several pictures of the scene). The method analyzes a captured image to identify a unique predefined displayed content (e.g., a first pattern or a sub-pattern of the first pattern) in a first region of the image. When the predefined displayed content is identified in the captured image, the method analyzes a second region of the image that is associated with the first region, in order to determine whether a set of one or more objects is within the second region. The second region is the same as the first region in some embodiments, while in other embodiments it is a bounding region (e.g., bounding shape) that encompasses the first region and a third region around the first region. In yet other embodiments, the second region has another association with the first region. When the method determines that an object is within the second region, the method generates and sends a notification (e.g., an email, a text message, an in-app message, etc.) regarding the detection of the object in the image.

In some embodiments, the analyzed images are images captured of a location (e.g., an area near or within a building) where packages are dropped off, and the set of objects include packages that are to be dropped off at that location. In some of these embodiments, the unique predefined displayed content is at least part of a pattern displayed on a drop-off receptacle at which packages are likely to be dropped off. This pattern is discernible to the naked eye in some embodiments, while in other embodiments it is not (e.g., is detectable only after spectral analysis of the image). Examples of drop-off receptacle include floormats or containers, while examples of patterns include fractal patterns displayed on the drop-off receptacles or other unique patterns displayed on these receptacles.

In some embodiments, the set of objects includes objects in a set of one or more categories of objects. Some of these embodiments use a machine-trained network to analyze the second region in order to try to detect objects within this region that fall into the object category set for which the machine-trained network is trained to identify. The machine-trained network is trained to identify just one category of objects (e.g., packages) in some embodiments, while in other embodiments, the machine-trained network is trained to identify more than one category of objects (e.g., packages, cars, people, company logos, etc.). The machine-trained network in some embodiments includes several machine-trained processing nodes connected to each other in a particular arrangement. Examples of such machine-trained networks include different types of neural networks, with machine-trained neurons as some or all of their machine-trained processing nodes.

The method of some embodiments is performed on several images captured from the scene (e.g., on some or all of the pictures of a video captured of the scene). The method of some embodiments analyzes each captured image to identify a predefined unique pattern, which can be a complete first pattern or a partial, sub-pattern of the first pattern. For each predefined unique pattern that is newly identified in a first portion of a particular image, the method analyzes a second portion of the particular image that is identified based on the first portion in order to determine whether an object is within the second portion. Upon determining that an object is within the second portion, the method provides a notification regarding detection of the object in the image.

In some embodiments, the method only analyzes the second portion of the particular image when a predefined unique pattern is newly identified in the particular image. A predefined unique pattern is newly identified in a current image when it is different than a last pattern that was identified in a prior image analyzed by the method. In some embodiments, the current image and the prior image can be immediately successive images that are analyzed by the method (i.e., the prior image was the image that was last analyzed before the current image) or can be non-successive images (i.e., at least one other previous image was analyzed between the current image and the prior image). In some embodiments, the detected first pattern or detected portion of the first pattern serve as a visual wake word for analyzing the second portion to determine whether an object is within the second portion.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

DETAILED DESCRIPTION that is captured by one or more images (e.g., by a video or several pictures of the scene). The method analyzes a captured image to identify a unique predefined displayed content (e.g., a first pattern or a sub-pattern of the first pattern) in a first region of the image. When the predefined displayed content is identified in the captured image, the method analyzes a second region of the image that is associated with the first region, in order to determine whether a set of one or more objects is within the second region. The second region is the same as the first region in some embodiments, while in other embodiments it is a bounding region (e.g., bounding shape) that encompasses the first region and a third region around the first region. In yet other embodiments, the second region has another association with the first region. When the method determines that an object is within the second region, the method generates and sends a notification (e.g., an email, a text message, an in-app message, etc.) regarding the detection of the object in the image.

In some embodiments, the analyzed images are images captured of a location (e.g., an area near or within a building) where packages are dropped off, and the set of objects include packages that are to be dropped off at that location. In some of these embodiments, the unique predefined displayed content is at least part of a pattern displayed on a drop-off receptacle at which packages are likely to be dropped off. This pattern is visible to the naked eye in some embodiments, while in other embodiments it is not (e.g., is detectable only after spectral analysis of the image). Examples of drop-off receptacle include floormats or containers, while examples of patterns include fractal patterns displayed on the drop-off receptacles or other unique patterns displayed on these receptacles.

In some embodiments, the set of objects includes objects in a set of one or more categories of objects. Some of these embodiments use a machine-trained network to analyze the second region in order to try to detect objects in this regions that fall into the object category set for which the machine-trained network is trained to identify. The machine-trained network is trained to identify just one category of objects (e.g., packages) in some embodiments, while in other embodiments, the machine-trained network is trained to identify more than one category of objects (e.g., packages, cars, people, company logos, etc.). The machine-trained network in some embodiments includes several machine-trained processing nodes connected to each other in a particular arrangement. Examples of such machine-trained networks include different types of neural networks, with machine-trained neurons as some or all of their machine-trained processing nodes.

Figure 1:
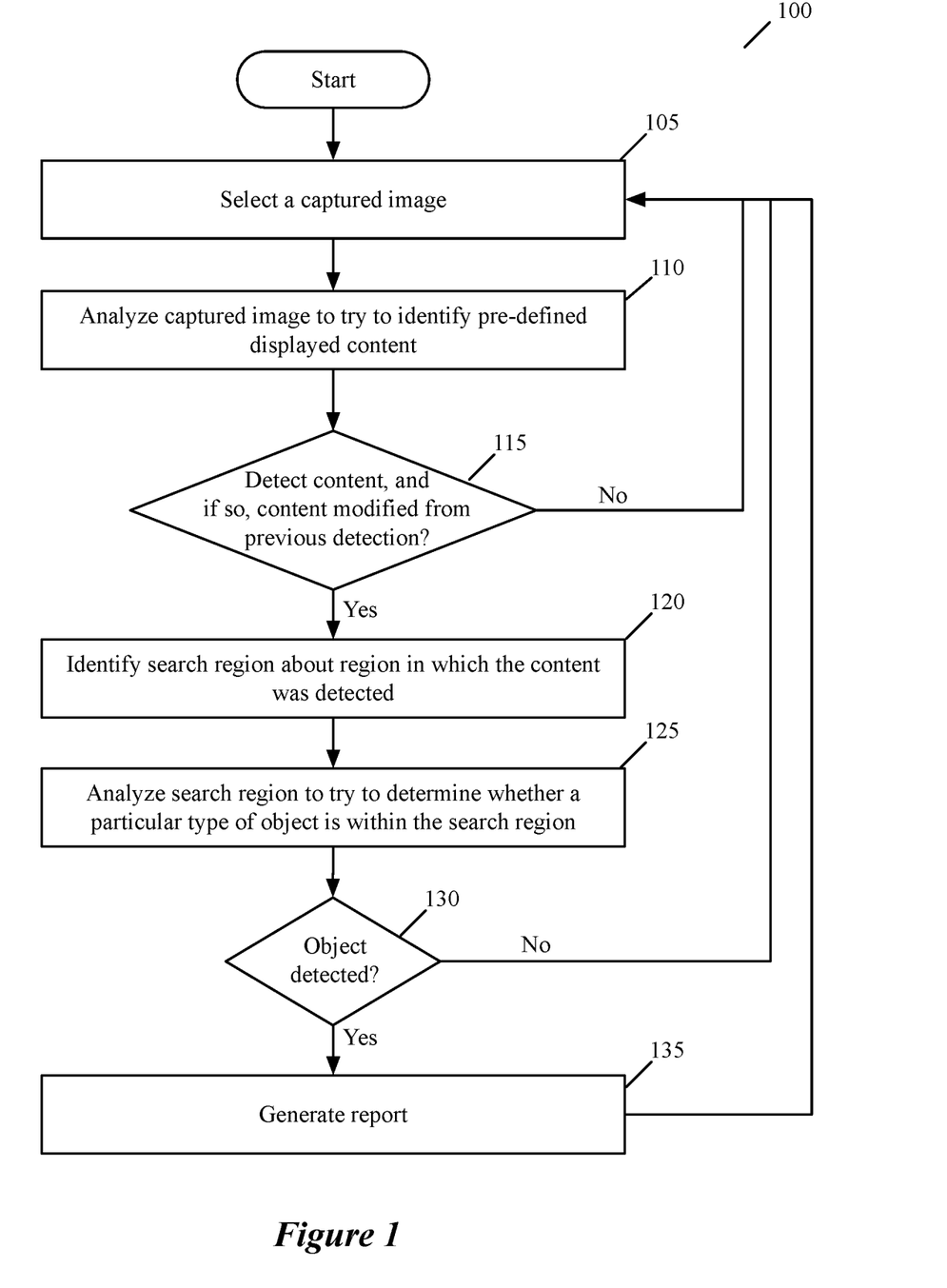
FIG. 1 illustrates a process that implements the method of some embodiments.

FIG. 1 illustrates a process 100 that implements the method of some embodiments. The process 100 in some embodiments analyzes video frames captured of a region (e.g., near a building or a house) to determine whether one or more types of objects are within that region. In some embodiments, the process 100 analyzes each frame of the video (1) to identify predefined displayed content, and (2) based on the detection of the identified predefined displayed content, to determine whether a new object from a set of one or more objects has appeared in the frame. In other embodiments, the process 100 performs this analysis not on each frame of the video but on each frame from a sampled set of frames of the video.

The process 100 will be explained below by reference to an example illustrated in FIGS. 2-5. These figures show the use of the process 100 to examine video frames captured by a camera 220 of an area 205 in front of a building 210 where packages are dropped off in a receptacle 212. A unique predefined pattern is displayed on or about this receptacle in some embodiments. The pattern in some embodiments includes the words "Drop Off" 214, which are printed using a particular fractal pattern. Alternatively, or conjunctively, the pattern in some embodiments includes a bounding box 216 around the words "Drop Off". In some embodiments, the pattern or a detected portion of the pattern serves as a visual wake pattern for analyzing (e.g., for initiating the analysis) a portion of the video frame to determine whether an object is within this portion.

The process 100 starts (at 105) by selecting an image captured from the area 105. In the example of FIGS. 2-5, the selected image is a video frame captured by a video camera 220. The image is selected by a computing device that executes the process 100 and operates at the building 210. In other embodiments, the computing device is located at a different location (e.g., is in a different building, city, state, country, etc.) than the building 210, and receives the captured video (i.e., the video captured by the camera 220) through a network from another computing device at the building 210 or a nearby building.

The process of some embodiments analyzes (at 110) the selected image (i.e., the video frame selected at 105) to determine whether the selected image contains the predefined unique displayed content. For this analysis, the process 100 uses a machine-trained network (e.g., a neural network) with machine-trained processing nodes (e.g., machine-trained neurons) to detect the existence of the predefined unique displayed content and the location of this content in the selected video frame. The displayed content is discernible to the naked eye in some embodiments, while in other embodiments it is not (e.g., is detectable only after spectral analysis of the image). Examples of predefined unique displayed content include patterns (such as fractal patterns or other types of patterns) or other unique displayed content that are printed or displayed on objects in the area 205.

The image analysis (at 110) of the process 100 searches for either a complete first predefined unique pattern, or a partial, sub-pattern of this first pattern. For instance, in the example of FIGS. 2-5, the unique predefined pattern displayed content is at least part of a first predefined unique pattern displayed on the drop-off receptacle 212 at which packages are supposed to be dropped off. As mentioned above, the drop-off receptacle has the words "Drop Off" written on it in some embodiments, and these words form all or part of the detected first pattern. The pattern displayed on or about the drop-off receptacle 212 is visible to the naked eye in some embodiments, while in other embodiments it is not (e.g., is detectable only after spectral analysis of the image). Examples of drop-off receptacle include floormats or containers, while examples of patterns include fractal patterns displayed on the drop-off receptacles or other unique patterns displayed on these receptacles.

Figure 2:
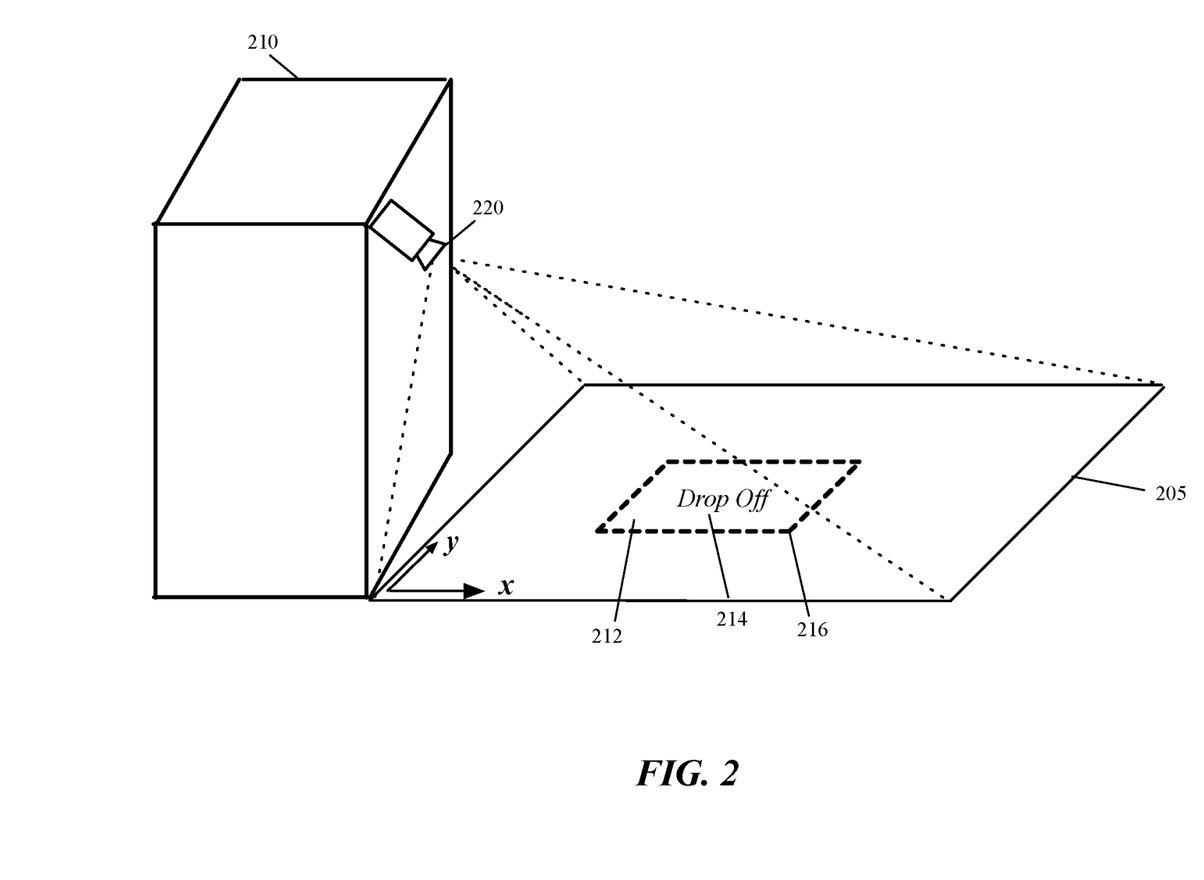
FIGS. 2-5 show the use of the process to examine video frames captured by a camera of an area in front of a building where packages are dropped off in a receptacle.

Next, at 115, the process determines whether it detected the predefined unique displayed content in the selected video frame. In some embodiments, the process 100 uses a first machine-trained network that outputs values indicative of the location of a region that contains the detected predefined unique displayed content, when the first machine-trained network detects the pattern in the selected image. In the example of FIG. 2, the pattern would detect a first region that contains the bounding box 216 and the words "Drop Off" 214, as this box and these words were rendered using a particular fractal pattern.

When the process 100 detects a pattern (at 115), the process 100 also determines (at 115) whether this pattern is different than a pattern that it last detected for a previous frame that it analyzed. A predefined unique pattern is newly detected for the currently selected video frame when it is different than a last pattern that was identified in a prior video frame analyzed by the process. The current video frame and the prior video frame can be immediately successive frames that are analyzed by the process (i.e., the prior frame was the frame that was last analyzed before the current frame) or can be non-successive frames (i.e., at least one other previous frame was analyzed between the current frame and the prior frame).

The purpose of determining whether the pattern detected in the currently selected video frame is different from the last pattern detected by the process 100 for a prior frame, is that the process 100 is designed to only search the selected video frame for a newly delivered object that would presumably occlude some portion of the predefined unique displayed content (e.g., the predefined unique pattern on or above the drop-off receptacle). In this manner, the process 100 would avoid repeatedly sending notifications regarding a delivered package by avoiding repeatedly detecting it in the scene, treating the package as if it was a newly detected package, and repeatedly generating a notification for it. For the first analyzed video frame in which the process 100 detects the pattern, the process 100 specifies the detected pattern as being newly detected as no other video frames were previously analyzed to include this pattern.

When the process 100 (at 115) determines that it does not detect the predefined unique displayed content or determines that it has detected the displayed content previously, it returns to 105 to select another captured video frame of the scene to analyze. On the other hand, when the process detected the predefined unique displayed content and determines that the detected predefined unique displayed content is newly detected, it transitions to 120. In the embodiments in which the process 100 uses the first machine-trained network that outputs values indicative of the location of a region that contains the detected predefined unique displayed content, the process 100 determines that the detected predefined unique displayed content is when the first machine-trained network produces a set of output values that are different from the last set of output values that the first machine-trained network produced to identify the last detected predefined unique displayed content.

Figure 3:
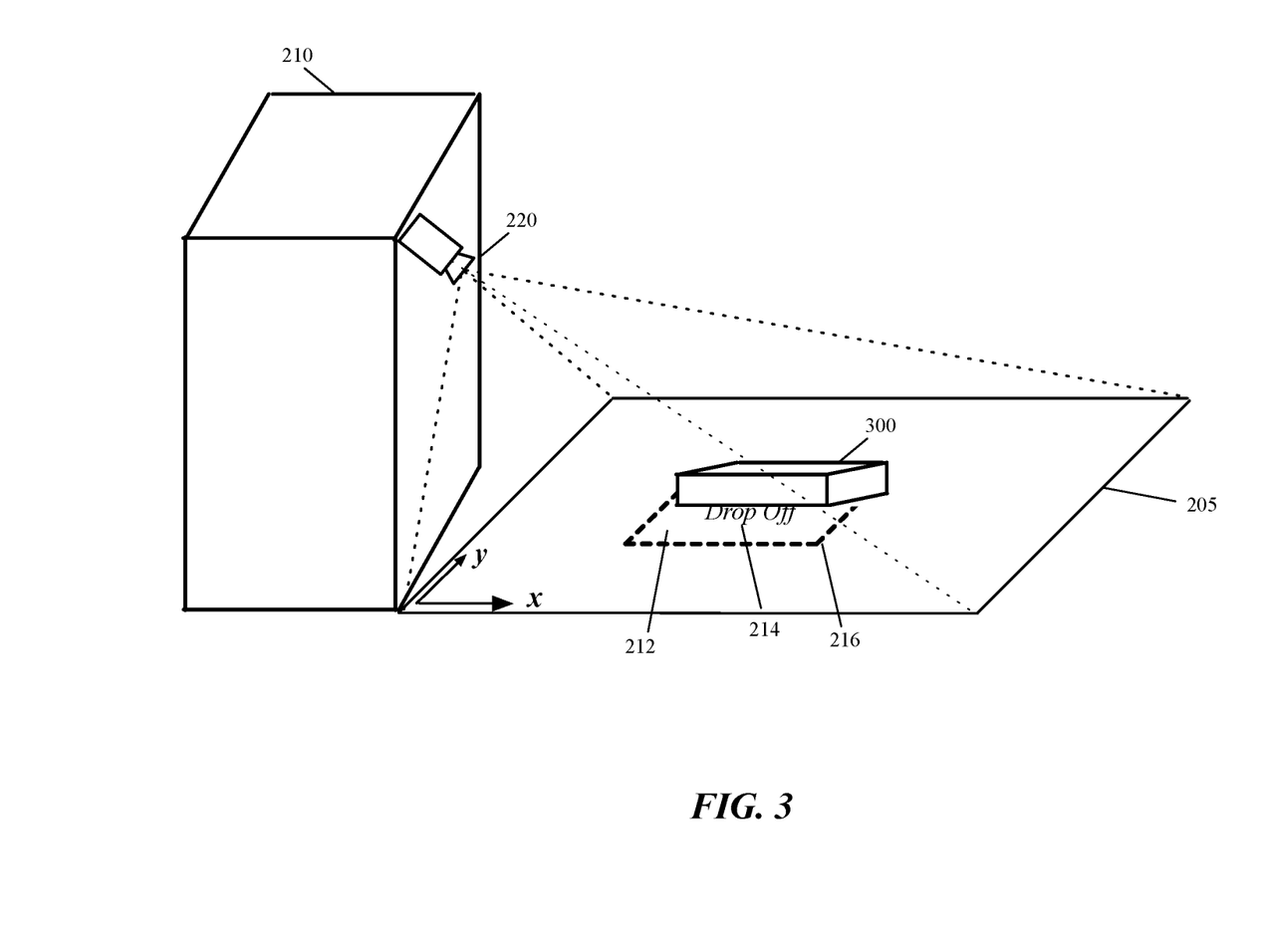

For instance, for the scene captured in FIG. 2, the process 100 in some embodiments produces a first set of output values that would indicate the entire region of the bounding box 216. However, once a package 300 is placed on the drop off receptacle 212 as shown in FIG. 3, the process 100 in some embodiments produces a second set of output values that would identify the region of the bounding box 216 that is not occluded by the dropped off package 300 and is visible in the scene captured by the video frame of the example of FIG. 3. As these two regions are different, so are the first and second output values that are produced by the first machine-trained network of the process 100.

At 120, the process identifies a search region about the region containing the predefined unique displayed content that was newly detected at 110. In some embodiments, the search region is defined as a bounding shape (e.g., bounding box, octagon, hexagon, etc.) about the region containing the predefined displayed content that was newly detected at 110. At 125, the process then analyzes the search region in order to determine whether an object is within the search region. To perform this analysis, the process 100 uses a second machine-trained network (e.g., another neural network) that has numerous machine-trained processing nodes (e.g., numerous machine-trained neurons), which are trained to detect one or more types of objects in a search region that it receives for the selected video frame. In some embodiments, the detection accuracy of the second-machine trained network is improved by having this network only search for the objects within a search region defined about a first region identified based on the first machine-trained network's detection of the predefined unique displayed content.

Figure 4:
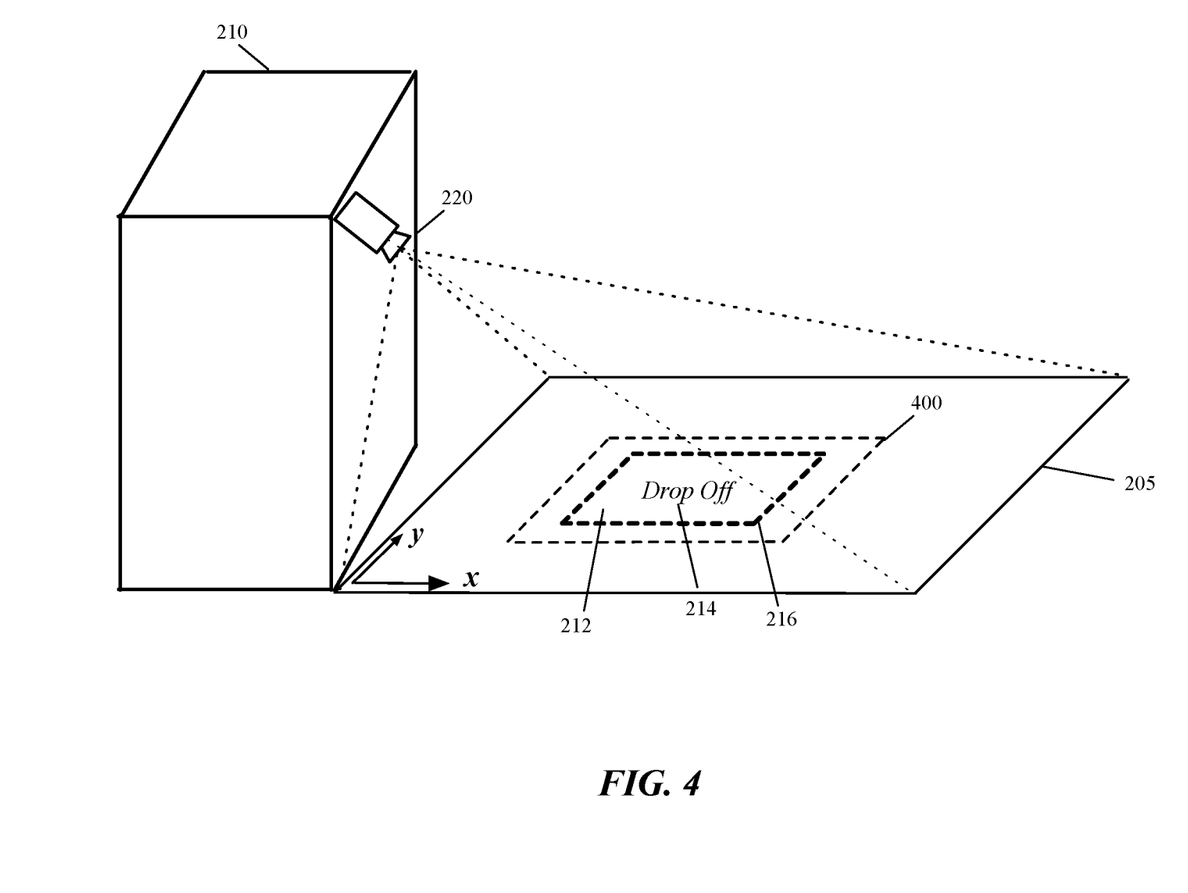
Figure 5:
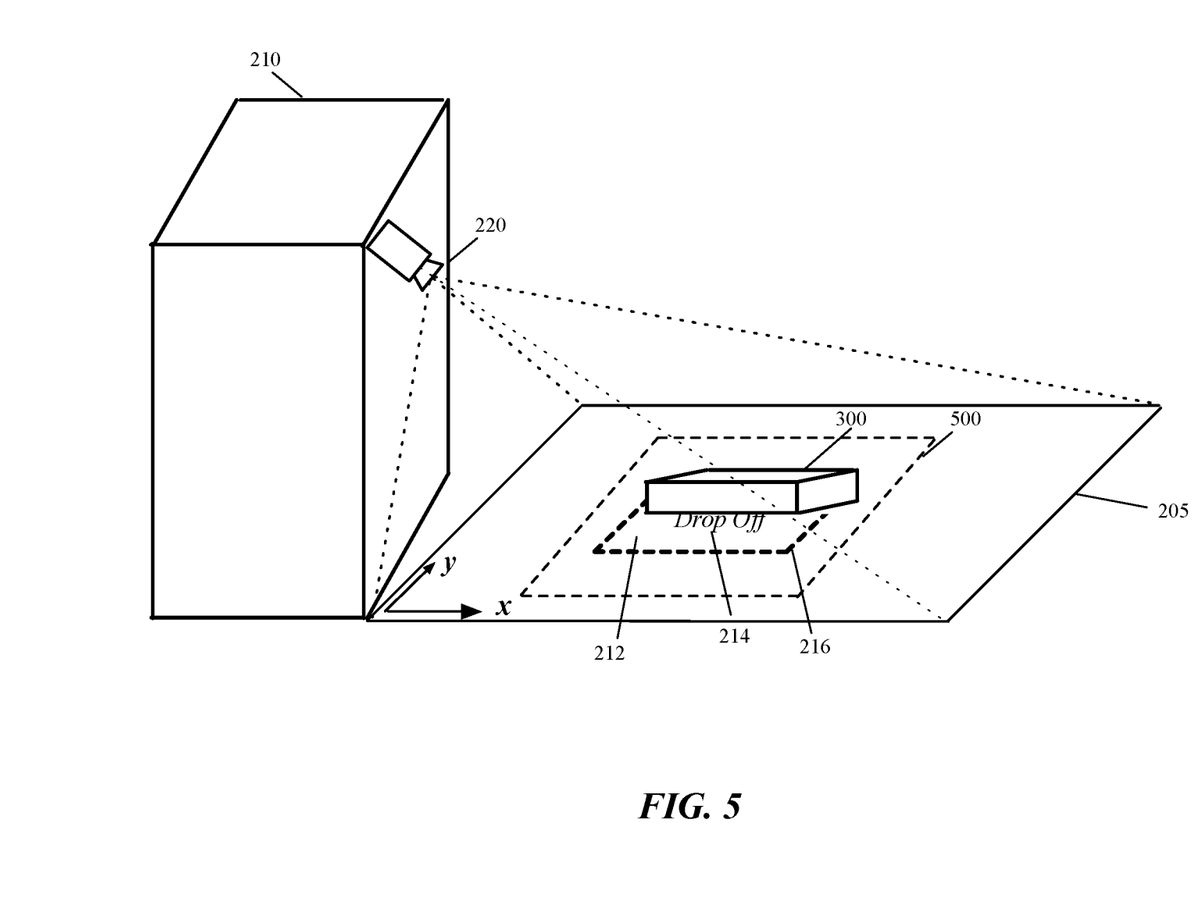

FIGS. 4 and 5 illustrate examples of search regions that are defined about the predefined unique patterns detected in FIGS. 2 and 3. As shown, some embodiments use a different type of search region 400 when the entire pattern is detected than the search regions 500 used when a partial pattern is detected as in FIG. 5. This is because when the entire pattern is detected, there is a higher certainty as to where the overall drop-off location will be on the drop-off receptacle than when the partial pattern is detected. Because of this higher certainty, a smaller search region is used in some embodiments when the entire pattern is detected than when the partial pattern is detected (i.e., the search region 400 is smaller than the search region 500). Other embodiments use the same size search region for when the full pattern or partial pattern is detected (e.g., some of these embodiments do not differentiate between a detected full pattern or detected partial pattern).

After 125, the process 100 determines (at 130) whether the second machine-trained network detected an object (for which it is trained to detected) within the search region. If not, the process 100 returns to 105 to select the next video frame to analyze. On the other hand, when the process 100 determines that the second machine-trained network detected an object within the search region, the process 100 generates (at 135) a report regarding this newly detected object, and then the process 100 returns to 105 to select the next video frame to analyze. As mentioned above, the process 100 in some embodiments is designed not to generate reports for the same detected object multiple times as it is designed not to search for the object unless the detected pattern changes from the last detected pattern. Examples of generated reports in some embodiments include notification emails, text messages, in-app messages, etc., regarding the detection of the object.

Other embodiments use other image analyzing processes that are different than process 100. For instance, after detecting (at 130) an object in a drop-off receptacle and generating (at 135) a report regarding the detected object, the image analyzing process of some embodiments does not try to identify additional objects in the subsequently analyzed video frames. Instead, it initiates another image-analyzing process that performs the operations 105-125, only this time in order to determine when the drop-off receptacle no longer has any other objects within it. When this new process detects this condition, it resets the generated notification (e.g., resets the in-app notification) and then re-initiates the process 100 to detect the next time an object is dropped off in the receptacle.

Conjunctively, or alternatively, after detecting an object in the drop-off receptacle, the image-analyzing process performs a third level of image analysis in order to try to recognize a company logo on the dropped off package. For instance, this third level of image analysis is used in some embodiments to determine whether the package was dropped off by Amazon, FedEx, UPS, DHL, etc. To perform the third level of image analysis, the process 100 in some embodiments uses a third-machine trained network (e.g., a third neural network) to identify any company logo on a dropped off package.

Figure 6:
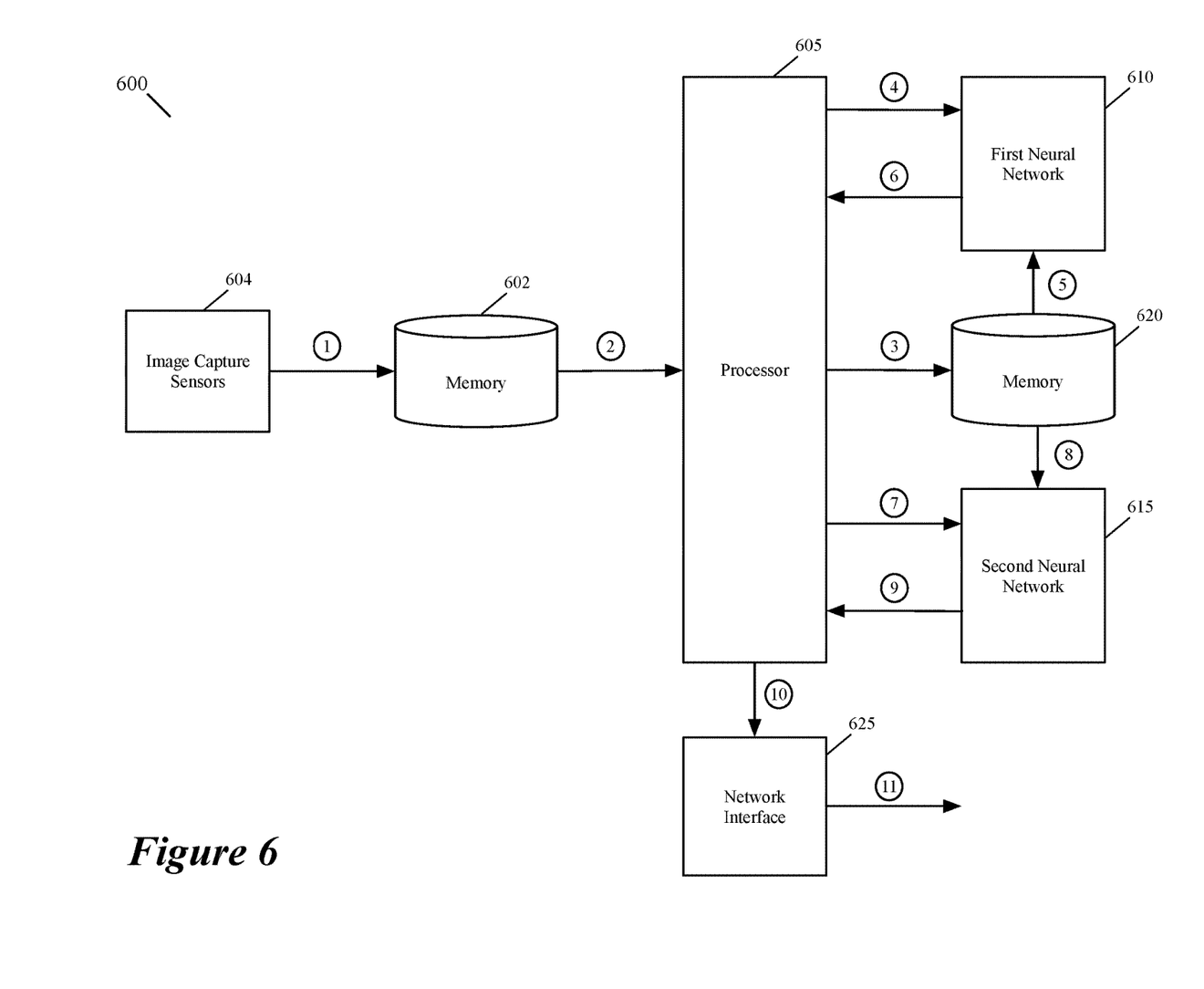
FIG. 6 illustrates an image processing circuit that performs the process of some embodiments.

FIG. 6 illustrates an image processing circuit 600 that performs the process 100 of some embodiments. As illustrated in this figure, the image processing circuit is a system on chip (SoC) of the video camera 220. However, in other embodiments, the image processing circuit 600 is a SoC or several integrated circuits of a base station that receives the video captured by the camera 220. As shown, the image processing circuit 600 includes a microprocessor 605, first and second neural networks 610 and 615, a memory 620 and a network interface 625.

In some embodiments, the two neural networks 610 and 615 are implemented by one application specific integrated circuit (ASIC), in other embodiments they are implemented by two different ASICs, and in still other embodiments they are implemented by the microprocessor 605 or another processor that executes a program that implements these neural networks. The two ASICs, the processor 605 and the memory 620 are part of one SoC in some of the embodiments that use one or two ASICs to implement the two neural networks 610 and 615.

As shown, the image processing circuit 600 iteratively retrieves video frames from a frame buffer 602 of the video camera's image sensors 604, and stores each retrieved video frame in its memory 620. For each frame that the first neural network 610 has to analyze, the processor 605 provides the frame's information (e.g., the frame identifier and/or the location in the memory 620 at which the frame is stored) to the first neural network 610. The first neural network 610 then retrieves the video frame and performs its image analysis to determine whether the predefined unique displayed content (e.g., the predefined unique pattern) appears anywhere in the video frame.

The first neural network in some embodiments has machine-trained neurons that are trained to detect the predefined unique displayed content. This training in some embodiments is a training process that feeds inputs with known outputs through the neural network and back propagates errors through the network in order to train the machine-trainable parameters (e.g., weights for combining neuron inputs, which can be inputs to the network or activation function outputs of earlier neurons) of the neurons.

When the first neural network 610 does not find the predefined unique displayed content in the video frame, its output to the processor 605 so indicates (e.g., the first neural network's output provides a set of values associated with the absence of the predefined unique displayed content in the video frame). On the other hand, when the first neural network 610 finds the predefined unique displayed content in the video frame, its output to the processor 605 in some embodiments identifies the detected displayed content. For instance, in some embodiments, the output of the first neural network 610 provides the location of the detected predefined unique displayed content in the video frame.

When the first neural network 610 finds the predefined unique displayed content in the video frame, and provides its location to the processor 605, the processor 605 defines a search region around this specified location and then directs the second neural network 615 to search this region to determine whether it can detect one of the objects for which it is trained to detect. To so direct the second neural network, the processor 605 provides in some embodiments the frame's information (e.g., the frame identifier and/or the location in the memory 620 at which the frame is stored) and the search region attributes (e.g., x- and y-axis coordinates of a bounding box that defines the search region in the video frame) to the second neural network 615.

The second neural network 615 then retrieves the video frame and performs its image analysis to determine whether it can detect one of the objects that it is trained to detect in the search region of the video frame that the processor 605 specified. The second neural network in some embodiments has machine-trained neurons that are trained to detect one or more types of objects (e.g., boxes, envelopes, etc.). This training in some embodiments is a training process that feeds inputs with known outputs through the neural network and back propagates errors through the network in order to train the machine-trainable parameters (e.g., weights for combining neuron inputs, which can be inputs to the network or activation function outputs of earlier neurons) of the neurons.

When the second neural network 615 does not find any object in the specified search region of the video frame, its output to the processor 605 so indicates (e.g., the second neural network's output provides a set of values associated with the absence of an object in the video frame). On the other hand, when the second neural network 615 finds an object in the search region (e.g., a box or a package) of the video frame, its output to the processor 605 in some embodiments specifies that it found an object (for which it was trained to detect) in the search region. For instance, in some embodiments, the output of the second neural network 615 is a single bit that specifies the existence of a detected object in the search region.

When the second neural network 615 detects an object in the search region and informs the processor of its existence, the processor 605 generates a report that it transmits through the network interface (e.g., network wireless interface) to one or more intended recipients of this report. Examples of generated reports in some embodiments include notification emails, text messages, in-app messages, etc., regarding the detection of the object.

Figure 7:
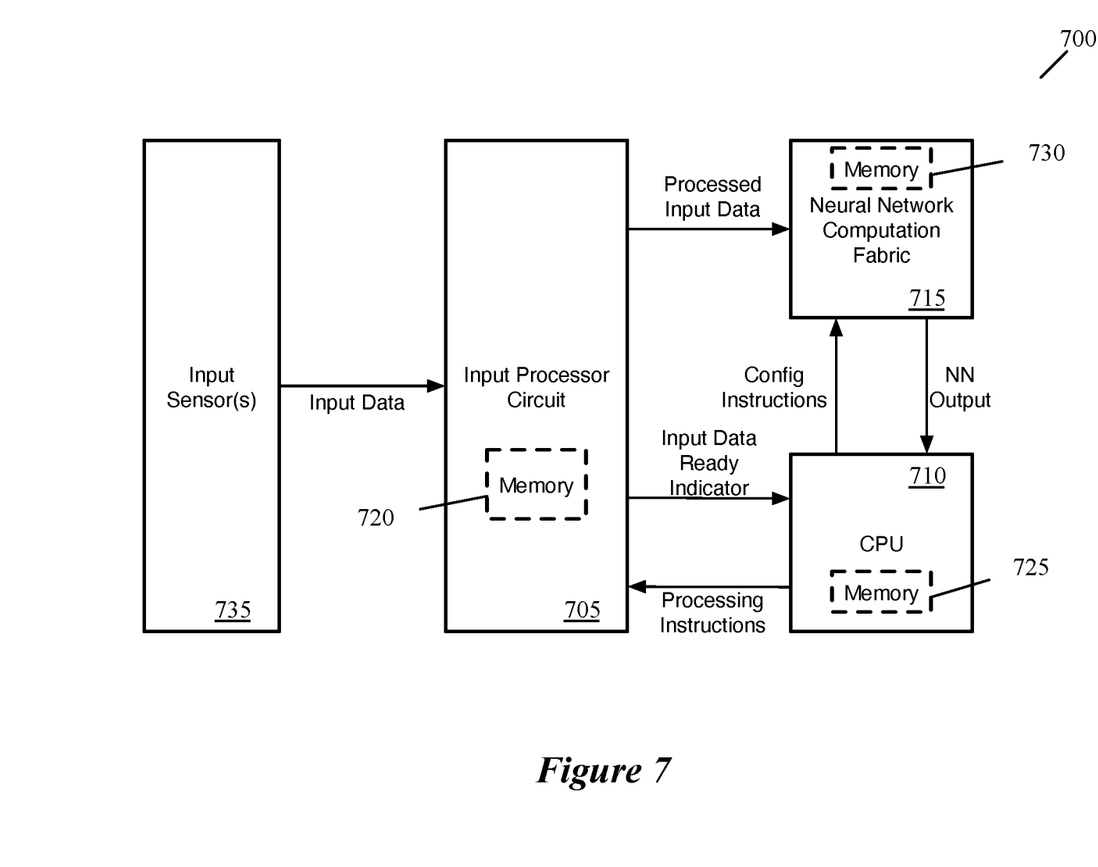
FIG. 7 illustrates a more detailed image processing circuit of some embodiments.

FIG. 7 conceptually illustrates a more detailed image processing circuit 700 of some embodiments. As shown, the circuit 700 includes an input processor circuit 705, a microprocessor (CPU) 710, and a neural network computation fabric 715. Each of these components 705-715 also has corresponding memory (e.g., random access memory (RAM)) 720, 725, and 730. In addition, in some embodiments, the circuit 700 is integrated into a camera with one or more sensors 735, including an image sensor. These input sensors can include image sensors (e.g., for capturing video images on which the neural network computation fabric 715 performs face or object recognition, etc.), microphones (e.g., for capturing audio on which the neural network computation fabric 715 performs voice recognition, speech processing, etc.), or other types of input sensors. In other embodiments, the input sensors 735 are located on a separate device that is linked with the circuit 700.

At bootup of the circuit 700, the CPU 710 in some embodiments loads neural network configuration data (e.g., weight values, scale and bias parameters, lookup table masks for each layer, memory locations for the weight and input values to use for computing each layer of the network, etc.) from off-chip storage and generates instructions for the neural network computation fabric 715 to write the weight values and other data to its memory 730. In addition, the CPU 710 loads the neural network program instructions for the computation fabric to its own memory 725. These instructions are applied by the computation fabric 715 to input data in order to execute the neural network. These runtime instructions include, e.g., indications as to which pre-loaded sets of instructions to use for each set of calculations, etc.

The input processor circuit 705 receives input data (e.g., still images or video frames, sounds, etc.) from the input sensor(s) 735, and processes these according to processing instructions received from the CPU 710. The CPU 710 stores in its memory instructions for the input processor circuit to prepare input data for the computation fabric 715 as well as the neural network program instructions. These instructions identify in some embodiments any sort of initial processing to apply to the raw data (e.g., decompression of compressed data, etc.) as well as how to arrange the data to be provided to the computation fabric 715. For an image, e.g., these instructions might specify the order in which the pixels should be arranged and streamed to the computation fabric 715, so that the computation fabric stores this data in the appropriate locations of its memory 730 for subsequent operations. The input processor circuit 705 also sends signals to the CPU 710 to indicate when it has fully buffered an input (e.g., a frame of video) and when the input is prepared to be sent to the computation fabric 715.

In addition to instructing the input processor circuit 705 how and when to provide input data to the computation fabric 715, the CPU 710 provides the neural network program instructions to the computation fabric. In some embodiments the CPU 710 provides these instructions in stages (e.g., one layer or portion of a layer at a time). Once the final output of the neural network is computed, the fabric 715 provides this output back to the CPU, so that the CPU (or other circuitry on the device) can evaluate this output and perform any actions based on the output.

The computation fabric of some embodiments provides a set of circuits for performing the various computations required for neural networks (e.g., dot product computations, scalar and bias operations, activation functions, etc.), with the network parameters (weight values, bias values, node arrangement, filter size, etc.) configurable. The computation fabric 715 is implemented by an ASIC (e.g., a single IC die that is custom defined to implement the neural network computation fabric). In some embodiments, this ASIC includes the CPU 710 and input processor 705, while in other embodiments one or both of these circuits 710 and 705 are implemented on other IC dies.

In some embodiments, the computation fabric 715 implements the first and second neural networks 610 and 615 of some embodiments of the invention. In some embodiments, the computation fabric imposes certain requirements on the networks, such as a maximum size of the network (i.e., a maximum size of the dot product computations), the ternary nature of its weight values (e.g., 0, $\alpha$, and $-\alpha$ for each layer of the network), and/or the imposition that a particular percentage of the weight values be equal to zero. The computation fabric 715 and its interaction with the other components of the circuit 700 are further described in U.S. patent application Ser. No. 16/457,756, which is incorporated herein by reference.

Figure 8:
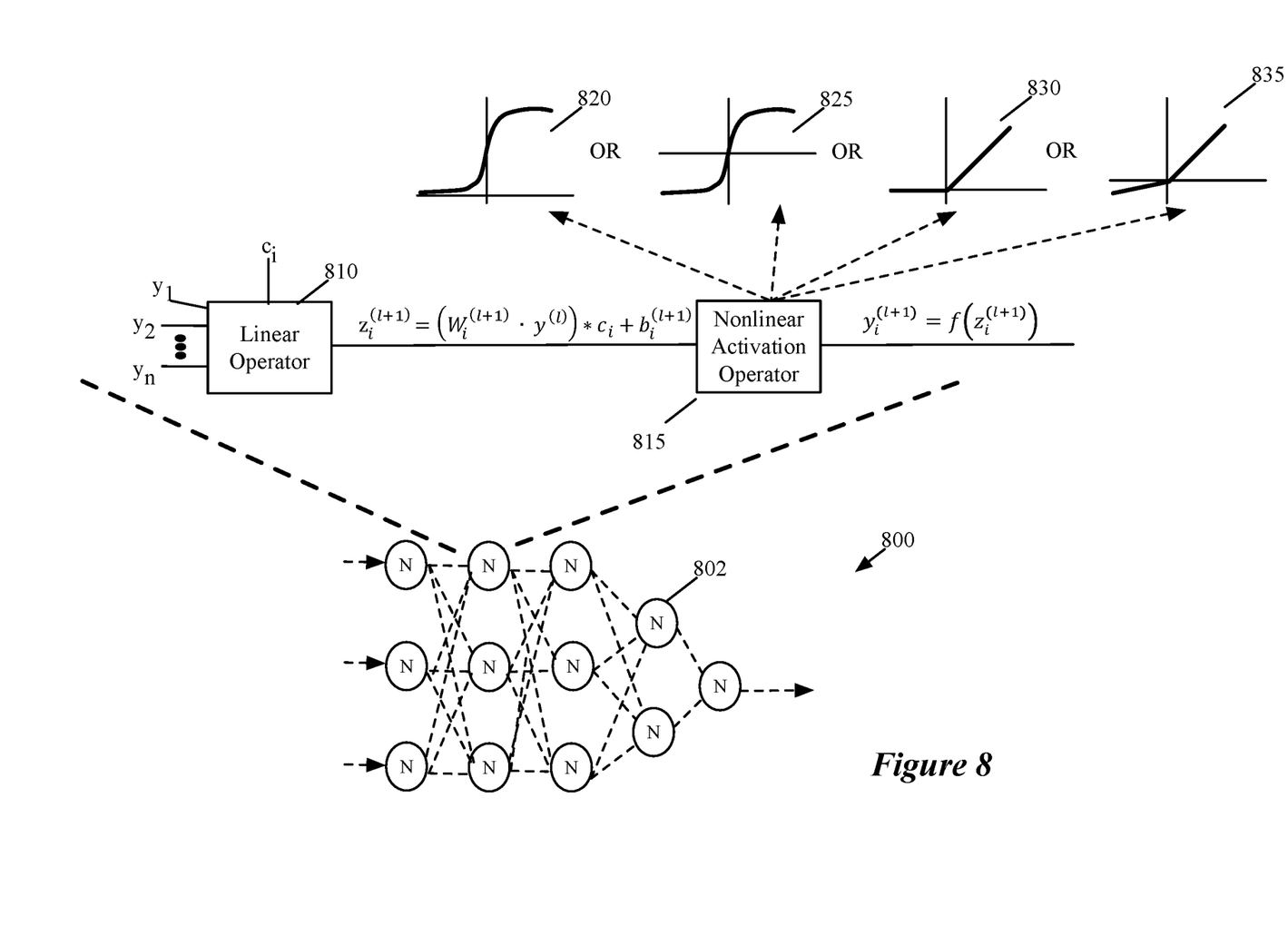
FIG. 8 illustrates an example of a multi-layer neural network used to implement some embodiments of the invention.

FIG. 8 illustrates an example of a multi-layer neural network used to implement some embodiments of the invention. This figure illustrates a feed-forward neural network 800 that has multiple layers of processing nodes 802 (also called neurons). In all but the first (input) and last (output) layer, each node 802 receives two or more outputs of nodes from earlier processing node layers and provides its output to one or more nodes in subsequent layers. The output of the node (or nodes) in the last layer represents the output of the network 800. In different embodiments, the output of the network 800 is a number in a range of values (e.g., 0 to 1), a vector representing a point in an N-dimensional space (e.g., a 128-dimensional vector), or a value representing one of a predefined set of categories (e.g., for a network that classifies each input into one of eight possible outputs, the output could be a three-bit value).

In this example, the neural network 800 only has one output node. Other neural networks of other embodiments have several output nodes that provide more than one output value. Furthermore, while the network 800 includes only a few nodes 802 per layer, a typical neural network may include a varying number of nodes per layer (with some layers having several thousand nodes) and significantly more layers than shown (e.g., several dozen layers). In addition, the neural networks of other embodiments may be types of networks other than feed forward networks (e.g., recurrent networks, regulatory feedback networks, radial basis function networks, etc.).

The illustrated network 800 is a fully-connected network in which each node in a particular layer receives as inputs all of the outputs from the previous layer. However, the neural networks of some embodiments are convolutional feed-forward neural networks. In this case, the intermediate layers (referred to as "hidden" layers) may include convolutional layers, pooling layers, fully-connected layers, and normalization layers. The convolutional layers of some embodiments use a small kernel (e.g., 3×3×3) to process each tile of pixels in an image with the same set of parameters. The kernels (also referred to as filters) are three-dimensional, and multiple kernels are used to process each group of input values in in a layer (resulting in a three-dimensional output). Pooling layers combine the outputs of clusters of nodes from one layer into a single node at the next layer, as part of the process of reducing an image (which may have a large number of pixels) or other input item down to a single output (e.g., a vector output). In some embodiments, pooling layers can use max pooling (in which the maximum value among the clusters of node outputs is selected) or average pooling (in which the clusters of node outputs are averaged).

As shown in FIG. 8, each node in the neural network 800 has a linear component 810 and a nonlinear component 815. The linear component 810 of each hidden or output node in this example computes a dot product of a vector of weight coefficients and a vector of output values of prior nodes, plus an offset. In other words, a hidden or output node's linear operator computes a weighted sum of its inputs (which are outputs of the previous layer of nodes) plus an offset (also referred to as a bias). Similarly, the linear component 810 of each input node of some embodiments computes a dot product of a vector of weight coefficients and a vector of input values, plus an offset. In other embodiments, each input node receives a single input and passes that input as its output. Each node's nonlinear component 815 computes a function based on the output of the node's linear component 810. This function is commonly referred to as the activation function, and the outputs of the node (which are then used as inputs to the next layer of nodes) are referred to as activations.

The notation of FIG. 8 can be described as follows. Consider a neural network with L hidden layers (i.e., L layers that are not the input layer or the output layer). The variable l can be any of the hidden layers (i.e., $l \in \{1, \ldots, L-1\}$ index the hidden layers of the network, with l=0 representing the input layer and l=L representing the output layer). The variable $z_i^{(l+1)}$ represents the output of the linear component of a hidden node i in layer l+1. As indicated by the following Equation (A), the variable $z_i^{(l+1)}$ is computed as the dot product of a vector of weight values $W_i^{(l+1)}$ and a vector of outputs $y^{(l)}$ from layer l multiplied by a constant value $c_i$, and offset by a bias value $b_i$:

$$z_i^{(l+1)} = \left(W_i^{(l+1)} \cdot y^{(l)}\right) * c_i + b_i^{(l+1)} = \sum_{k=1}^{n} \left(w_{ik}^{(l+1)} * y_k^{(l)}\right) * c_i + b_i^{(l+1)}. \quad (A)$$

The constant value $c_i$ is a value to which all the weight values are normalized. In some embodiments, the constant value $c_i$ is 1. The symbol * is an element-wise product, while the symbol • is the dot product. The weight coefficients $W^{(l)}$ are parameters that are adjusted during the network's training in order to configure the network to solve a particular problem (e.g., object or face recognition in images, voice analysis in audio, depth analysis in images, etc.). In some embodiments, the training algorithm imposes certain constraints on the weight values. Specifically, some embodiments impose a ternary constraint that requires all of the weight values for any given layer to be either zero, a positive value, or a negation of the positive value (e.g., 0, 1, and −1). In addition, some embodiments use a training technique that maximizes the number of weight values that are equal to zero (such that, e.g., 75% or 90% of the weight values equal zero).

The output $y_i^{(l+1)}$ of the nonlinear component 815 of a node in layer l. l is a function of the node's linear component, and can be expressed as by Equation (B) below:

$$y_i^{(l+1)} = f(z_i^{(l+1)}). \quad (B)$$

In this equation, $f$ is the nonlinear activation function for node i. Examples of such activation functions include a sigmoid function 820 ($f(x)=1/(1+e^{-x})$), a tanh function 825, a ReLU (rectified linear unit) function 830 or a leaky ReLU function 835, as shown.

Traditionally, the sigmoid function and the tanh function have been the activation functions of choice. More recently, the ReLU function ($f(x)=\max(0, x)$) has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv: 1502.01852, 2015. In some embodiments, the activation functions can be other types of functions, like cup functions and periodic functions.

Equation (B) can be expressed in the following expanded format of Equation (C):

$$y_i^{(l+1)} = f(z_i^{(l+1)}) = f\left[\left(\sum_{k=1}^{n} w_{ik} * y_k\right) * c_i + b_i^{(l+1)}\right]. \quad (C)$$

In this equation, $w_{ik}$ are weight values associated with the inputs $y_k$ of the node i in layer l+1.

Before a multi-layer network can be used to solve a particular problem, the network is put through a supervised training process that adjusts the network's configurable parameters (e.g., the weight coefficients of its linear components). The training process iteratively selects different input value sets with known output value sets. For each selected input value set, the training process typically (1) forward propagates the input value set through the network's nodes to produce a computed output value set and then (2) backpropagates a gradient (rate of change) of a loss function (output error) that quantifies in a particular way the difference between the input set's known output value set and the input set's computed output value set, in order to adjust the network's configurable parameters (e.g., the weight values).

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
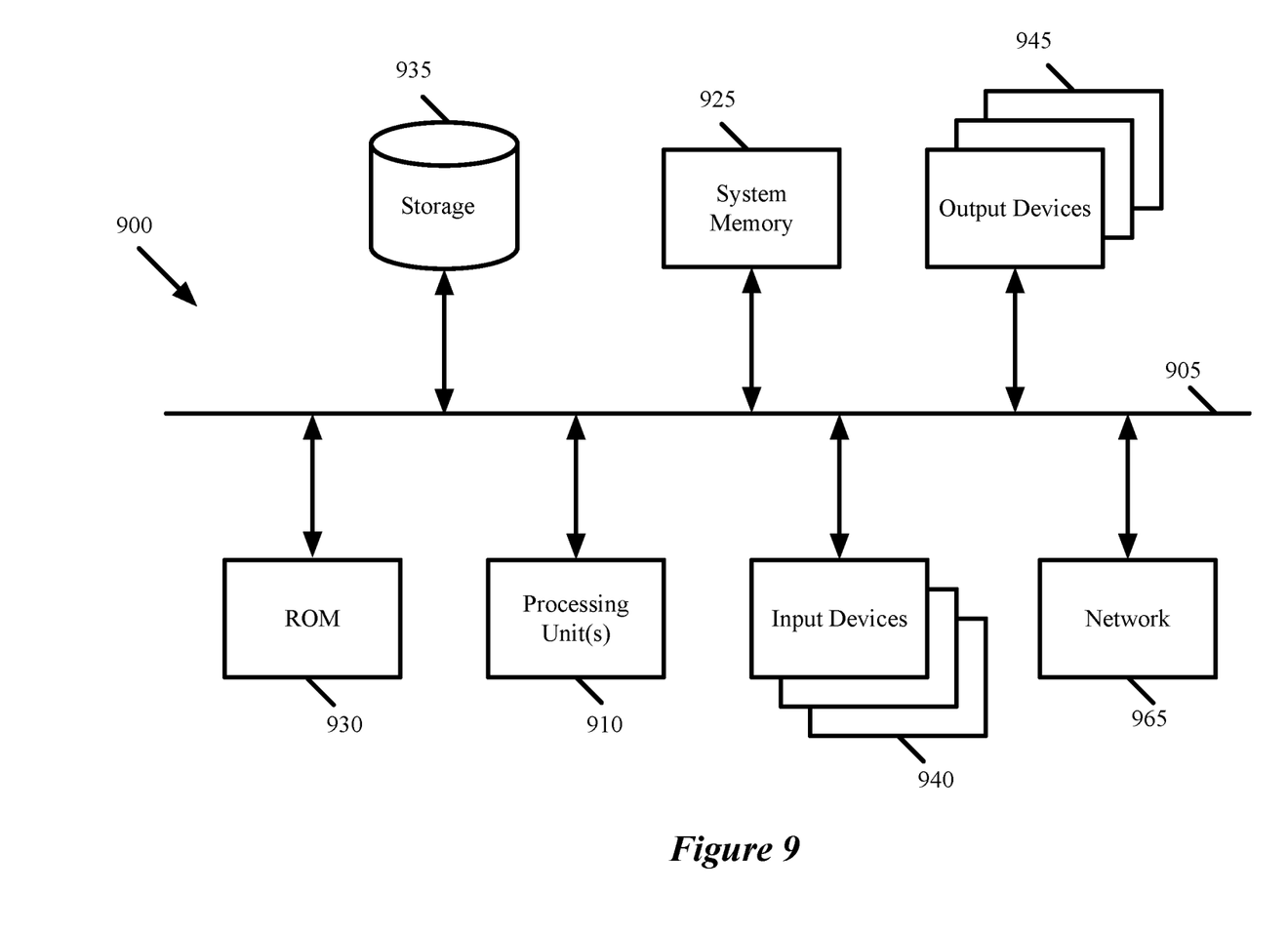
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer (e.g., a desktop computer, personal computer, tablet computer, server computer, mainframe, a blade computer etc.), or any other sort of electronic device, such as the computing device associated with a camera or base station used by some embodiments of the invention. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieves instructions to execute and data to process in order to execute the processes of the invention. The processing unit(s) may be a single processor or a multi-core processor in different embodiments. The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such a random-access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieves instructions to execute and data to process in order to execute the processes of some embodiments.

The bus 905 also connects to the input and output devices 940 and 945. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of performing analysis on an image, the method comprising:
   capturing a plurality of images of a scene;
   for each captured image of the plurality of images:
   propagating the captured image through a first plurality of layers of a first machine trained (MT) network to identify whether a predefined unique pattern is newly present in the captured image; and
   when a first portion of the captured image includes a newly present predefined unique pattern:
   propagating the captured image through a second plurality of layers of a second MT network to determine whether an object is within a second portion of the captured image that is identified based on the first portion that includes the newly present predefined unique pattern;
   wherein, when no predefined unique pattern is identified as newly present within a particular captured image, the particular captured image is not propagated through the second plurality of layers of the second MT network, wherein the second MT network is configured to bypass the second plurality of layers when no predefined unique pattern is identified as newly present within the first portion of the captured image; and
   upon determining that an object is within the second portion of the captured image, providing a notification regarding detection of the object in the image.

2. The method of claim 1, comprising:
   propagating the image through the first plurality of layers of the first machine-trained (MT) network to identify the unique predefined visible content in a first region of the image;
   based on identification of the unique predefined visible content in the first region of the image, propagating the same image through the second plurality of layers of the second, different MT network to determine whether a set of one or more types of objects is visible within a second region of the image, the second region associated with the first region; and
   upon determining that an object of one of the set of one or more types of objects is visible within the second region, providing the notification regarding detection of the object in the image.

3. The method of claim 2, wherein:
   the set of one or more types of objects comprises packages;
   the image is an image of a location where packages are dropped off; and
   the unique predefined visible content is at least part of a pattern displayed on a drop-off receptacle at which packages are likely to be dropped off.

4. The method of claim 3, wherein the drop-off receptacle is a floormat or a container.

5. The method of claim 3, wherein the pattern is a fractal pattern displayed on the drop-off receptacle.

6. The method of claim 2, wherein when the unique predefined visible content is not identified within the first region of the image, the image is not propagated through the second MT network.

7. The method of claim 1, wherein the second MT network is trained to identify just one type of objects.

8. The method of claim 1, wherein the second MT network is trained to identify more than one type of objects.

9. The method of claim 1, wherein the second MT network comprises a plurality of machine-trained processing nodes connected to each other based on a particular arrangement.

10. The method of claim 1, wherein the second MT network is a neural network comprising a plurality of machine-trained neurons.

11. The method of claim 1, wherein the second portion is the same as the first portion.

12. The method of claim 1, wherein the second portion is a bounding shape that encompasses the first portion and a third portion of the captured image around the first portion.

13. The method of claim 1, wherein:
each predefined unique pattern that is identified in one of the captured images is a first pattern or a sub-pattern of the first pattern; and
a predefined unique pattern is newly identified in one of the captured images when the predefined unique pattern is different than a last pattern identified in a prior image.

14. The method of claim 13, wherein the first pattern is used as a visual wake word for analyzing the second portion in each particular image in which the first pattern is identified to determine whether an object is within the second portion of the particular image.

15. A non-transitory machine readable medium storing a program for analyzing an image, the program for execution by at least one processing unit, the program comprising sets of instructions for:
capturing a plurality of images of a scene; and
for each captured image of the plurality of images:
propagating the captured image through a first plurality of layers of a first machine-trained (MT) network to identify whether a predefined unique pattern is newly present in the captured image;
when a first portion of the captured image includes a newly present predefined unique pattern:
propagating the captured image through a second plurality of layers of a second MT network to determine whether an object is within a second portion of the captured image that is identified based on the first portion that includes the newly present predefined unique pattern, wherein the second MT network is configured to bypass the second plurality of layers when no predefined unique pattern is identified as newly present within the first portion of the captured image; and
upon determining that an object is within the second portion of the captured image, providing a notification regarding detection of the object in the captured image.

16. The non-transitory machine readable medium of claim 15, wherein:
each predefined unique pattern that is identified in one of the captured images is a first pattern or a sub-pattern of the first pattern; and
a predefined unique pattern is newly identified in one of the captured images when the predefined unique pattern is different than a last pattern identified in a prior image.

17. The non-transitory machine readable medium of claim 16, wherein the first pattern is used as a visual wake word for analyzing the second portion in each particular image in which the first pattern is identified to determine whether an object is within the second portion of the particular image.

18. The non-transitory machine readable medium of claim 15, wherein the second portion is the same as the first portion.

19. The non-transitory machine readable medium of claim 15, wherein the second portion is a bounding shape that encompasses the first portion and a third portion around the first portion.

20. The non-transitory machine readable medium of claim 15, wherein the object is a package and the plurality of images are images of a location where packages are dropped off.

* * * * *